United States Patent
Venkitaraman et al.

(10) Patent No.: US 7,653,813 B2
(45) Date of Patent: Jan. 26, 2010

(54) METHOD AND APPARATUS FOR ADDRESS CREATION AND VALIDATION

(75) Inventors: Narayanan Venkitaraman, Schaumburg, IL (US); Vidya Narayanan, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 133 days.

(21) Appl. No.: 11/275,982

(22) Filed: Feb. 8, 2006

(65) Prior Publication Data

US 2007/0260884 A1  Nov. 8, 2007

(51) Int. Cl.
 *H04L 9/32* (2006.01)
(52) U.S. Cl. .............. 713/169; 713/160; 713/162; 713/168; 713/173; 713/176; 713/190; 380/277; 370/331; 370/338; 370/401; 709/225; 709/226; 709/227; 709/228; 709/229; 726/2; 726/3; 726/4
(58) Field of Classification Search ............ 380/277, 380/227; 713/169, 168, 162, 176, 173, 160, 713/190; 726/2–4; 709/225–229; 370/331, 370/338, 401
See application file for complete search history.

(56) References Cited

U.S. PATENT DOCUMENTS

| | | | | |
|---|---|---|---|---|
| 7,028,186 | B1* | 4/2006 | Stenman et al. | 713/173 |
| 7,246,231 | B2* | 7/2007 | Tariq et al. | 713/162 |
| 2002/0133607 | A1 | 9/2002 | Nikander | |
| 2004/0008845 | A1* | 1/2004 | Le et al. | 380/277 |
| 2004/0193875 | A1* | 9/2004 | Aura | 713/162 |
| 2005/0041675 | A1* | 2/2005 | Trostle et al. | 370/401 |
| 2005/0073979 | A1* | 4/2005 | Barber et al. | 370/338 |
| 2006/0005014 | A1* | 1/2006 | Aura et al. | 713/162 |
| 2006/0020796 | A1* | 1/2006 | Aura et al. | 713/168 |
| 2006/0020807 | A1* | 1/2006 | Aura et al. | 713/176 |
| 2006/0274693 | A1* | 12/2006 | Nikander et al. | 370/331 |

FOREIGN PATENT DOCUMENTS

WO  WO02076060  9/2002
WO  WO 2006128481 A2 * 12/2006

OTHER PUBLICATIONS

J. Arkko et al. A Taxonomy and Analysis of Enhancements to Mobile IPv6 Route Optimization. Network Working Group : Jan. 26, 2005. http://www3.tools.ietf.org/html/draft-irtf-mobopts-ro-enhancements-00.*
Aboba et al. Extensible Authentication Protocol. The Internet Society: Jun. 2004.*
J. Arkko et al. A Taxonomy and Analysis of Enhancements to Mobile IPv6 Route Optimization. Network Working Group : Jan. 26, 2005. http:llwww3.tools.ietf.orglhtmlldraft-irtf-mobopts-ro-enhancements-O0.*

(Continued)

*Primary Examiner*—Michael J Simitoski
*Assistant Examiner*—Kari L Schmidt

(57) ABSTRACT

All nodes within a communication system (100) will create an IP address based on a shared-secret key. The shared-secret key is unique for every node within the communication system and is known only to the node (102) and a server (103). The router (101) can validate that the node (102) owns the IP address.

19 Claims, 2 Drawing Sheets

OTHER PUBLICATIONS

T. Aura, Abstract, "Cryptographically Generated Addresses," Microsoft Research, Mar. 2005, pp. 1-21.
R. Koodli, Abstract, "Fast Handover for Mobile IPv6," Nokia Research, Jul. 2005, pp. 1-40.
V. Narayanan et al., "Handover Keys Using AAA," Internet Draft, Oct. 21, 2005, pp. 1-28.
Droms, et al., "Request for Comments: 3315, Standards Track, Dynamic Host Configuration Protocol for IPv6 (DHCPv6)," The Internet Society, Jul. 2003, 17 pages.
T. Aura, "Request for Comments: 3972, Standards Track, Cryptographically Generated Addresses (CGA)," The Internet Society (2004), Mar. 2005, 22 pages.
Lee W. Young, "PCT International Search Report and Written Opinion," WIPO, ISA/US, Commissioner for Patents, Alexandria, VA, USA, Feb. 11, 2008.
Ellen Moyse, "PCT International Preliminary Report on Patentability," The International Bureau of WIPO, Geneva, Switzerland, Aug. 21, 2008.

* cited by examiner

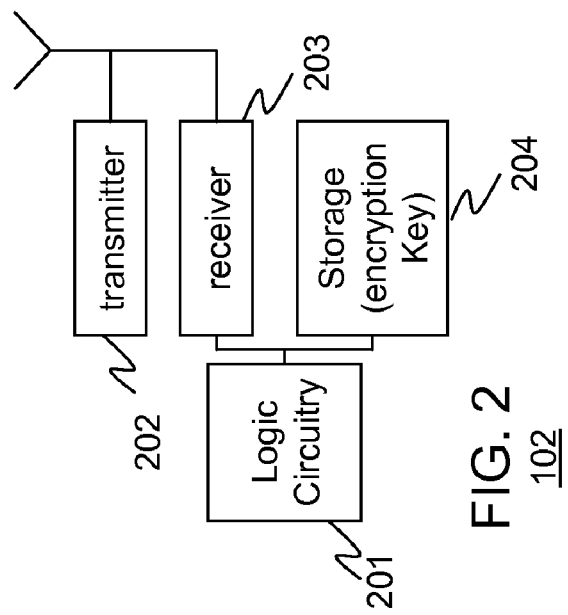
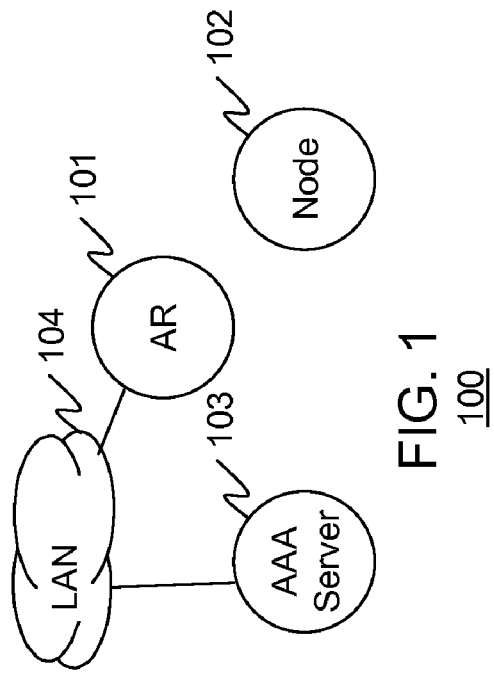

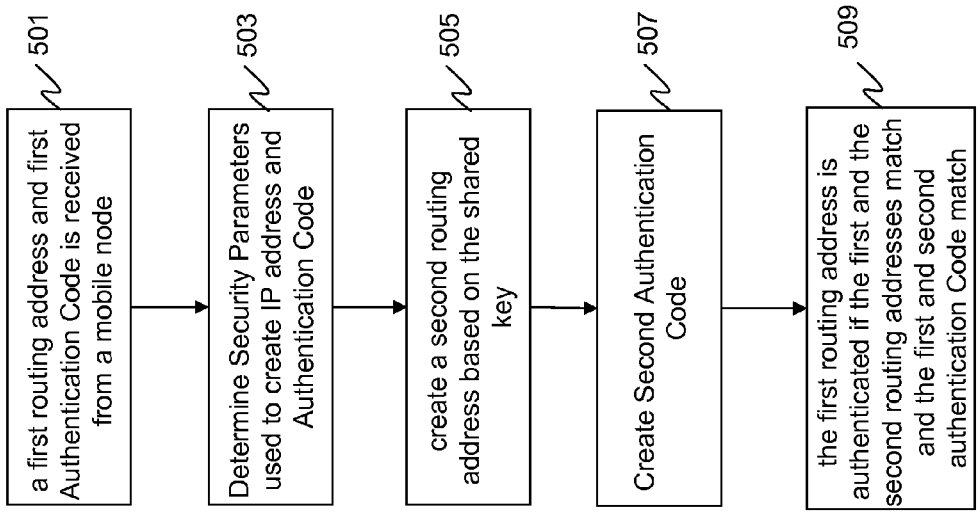
FIG. 5
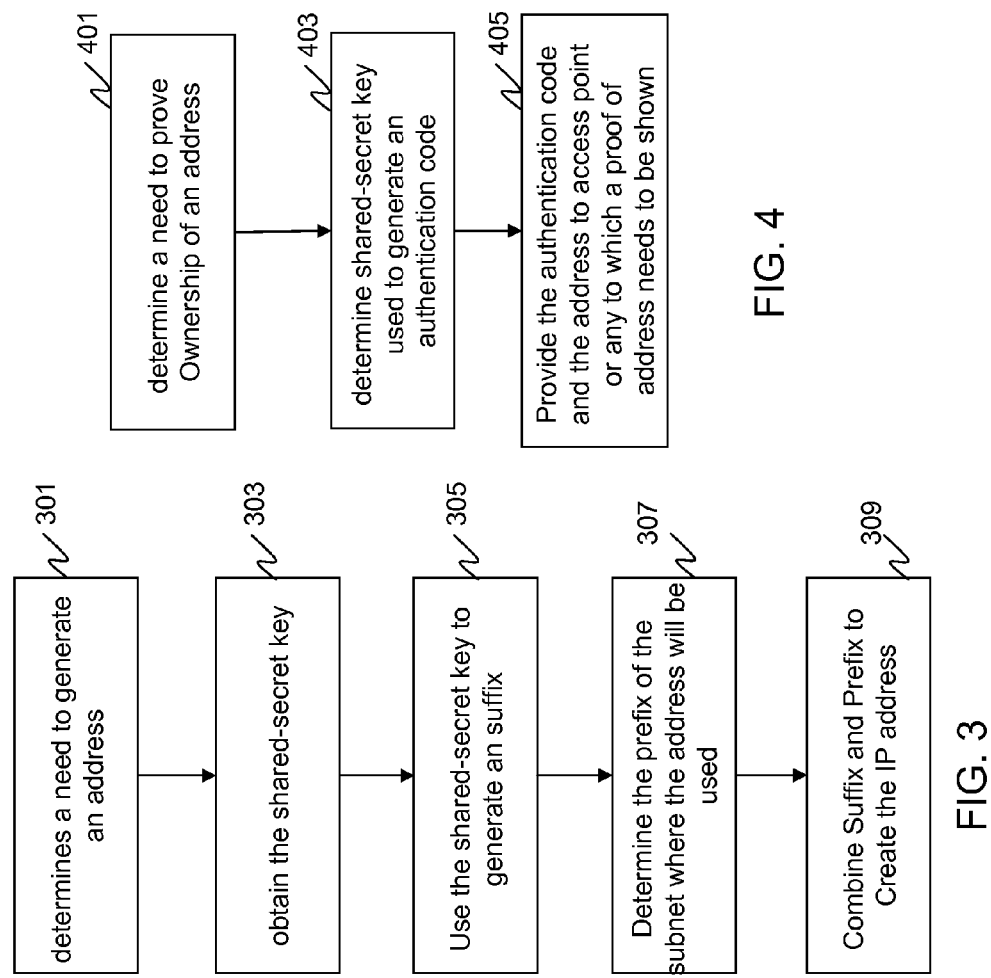
FIG. 4
FIG. 3

METHOD AND APPARATUS FOR ADDRESS CREATION AND VALIDATION

FIELD OF THE INVENTION

The present invention relates generally to address assignment and in particular, to a method and apparatus for address creation and validation within a communication system.

BACKGROUND OF THE INVENTION

The Internet Protocol (IP) developed by the Internet Engineering Task Force has become the primary underlying protocol for devices to communicate with each other. For devices to communicate with each other, a unique routing address, (e.g., an internet protocol (IP) address), is needed so that a device can be uniquely identified and packets destined to a particular device can be routed or forwarded correctly to it. The IP address of a device such as a mobile node can be configured manually in the node itself or a node can obtain the address from a server such as a Dynamic Host Configuration Protocol (DHCP) server or an Authentication, Authorization and Accounting (AAA) server. Once a node obtains an IP address it may need to send messages to manipulate the routing behavior corresponding to that address. Specifically a node may send an advertisement message that maps the IP address to its own MAC address or may send a binding update message to reroute packets destined to its IP address to a different acquired IP address in a different network.

A problem with current techniques for manually configuring an IP address is that unscrupulous users may claim an address that is currently being used by another node. Thus, a need exists for a method and apparatus for address creation and validation within a communication system that allows the verification that a node can indeed lay claim to a particular address.

BRIEF DESCRIPTION OF THE DRAWINGS

FIG. 1 is a block diagram of a communication system.

FIG. 2 is a block diagram of a node within the communication system of FIG. 1.

FIG. 3 is a flow chart showing the operation of the node of FIG. 2.

FIG. 4 is a flow chart showing the operation of the node of FIG. 2.

FIG. 5 is a flow chart showing operation of the server of FIG. 1.

DETAILED DESCRIPTION OF THE DRAWINGS

In order to address the above-mentioned need, a method and apparatus for address creation is provided herein. All nodes within a communication system will create an IP address based on a shared-secret key. The shared-secret key is unique for every node within the communication system and is known only to the node and a server. An entity trying to validate the address may use the mobile ID along with other parameters such as Security Parameter Index (SPI), to look up the shared key that would be used by the mobile node for address generation. The address can then be properly validated. The SPI is typically an index (e.g., a 32 bit number) used to look up security parameters (such as key, algorithm to be used etc.).

The present invention encompasses a method for creating a routing address. The method comprises the steps of accessing a shared-encryption key and creating the routing address based on the shared-encryption key.

The present invention additionally encompasses a method for creating an internet protocol (IP) address. The method comprises the steps of accessing a shared-encryption key and creating the IP address based on the shared-encryption key.

The present invention additionally encompasses an apparatus comprising storage storing a shared-encryption key, and logic circuitry creating an IP address based on the shared-encryption key.

The present invention additionally encompasses a method comprising the steps of receiving a first routing address, determining a shared-encryption key, wherein the shared encryption key is shared among a node and a server, and creating a second routing address based on the shared-encryption key. The first routing address is authenticated if the first and the second routing address match.

Turning now to the drawings, wherein like numerals designate like components, FIG. 1 is a block diagram of communication system 100. In the preferred embodiment of the present invention, communication system 100 utilizes a communication system protocol as described by the IETF specifications. However, in alternate embodiments communication system 100 may utilize other communication system protocols such as, but not limited to, a communication system protocol defined by the WiMAX, 3GPP, 3GPP2, a communication system protocol defined by the IEEE 802.15.3 Wireless Personal Area Networks for High Data Rates standard, or the communication system protocol defined by the IEEE 802.15.4 Low Rate Wireless Personal Area Networks standard, . . . , etc.

Communication system 100 includes a number of network elements such as access router (AR) (sometimes referred to as Access Point) 101, node 102, server 103 (preferably an AAA server), and local-area network (LAN) 104. It is contemplated that network elements within communication system 100 are configured in well known manners with processors, memories, instruction sets, and the like, which operate in any suitable manner to perform the functions set forth herein. Although only a single access router 101 and node 102 are shown, one of ordinary skill in the art will recognize that typical networks comprise many access routers in communication with many nodes. As shown, access router 101 is coupled to LAN 104. All nodes preferably access LAN 104 by communicating via transmissions over an RF communication channel through access router 101, but alternatively may comprise any transmission, either wired or wireless.

During operation, mobile station 102 authenticates with communication system 100 by performing full authentication exchange with a network entity such as an Authentication, Authorization, Accounting server (AAA server 103) or an Extensible Authentication protocol server (EAP server) that is aware of the mobile station's rights with respect to network access. As part of the prior-art authentication process, node 102 obtains an address (e.g., an IP address) (using stateless configuration [RFC 2462] or from a Dynamic Host Configuration Protocol (DHCP) server for instance) and supplies that to access router 101. As discussed above, when a mobile obtains an IP address in this manner there is no way for another node, specifically, the access router to verify that the mobile node legitimately owns the IP address.

In order to address this issue, the IP address corresponding to a node in communication system 100 will be created using a shared-secret (alternatively referred to as a shared-encryption or a shared-address generation) key. The shared-secret key is unique for every node within communication system 100 and is known only to the node and server 103. In one embodiment this key is used directly to create the address. In another embodiment a shared key between node 102 and server 103 is used to create a new shared key between node 102 and access router 101 and the new shared key is used to create an address(s) when the node is at router 101.

Once an IP address has been created using the shared key, the network (specifically AR 102) can verify that the IP address in fact belongs to the node 102. In one embodiment the access router 101 for a subnet will receive a mobile nodes requested IP address, along with a mobile ID, and an authentication code (AC) whenever a mobile node wishes to request an operation (such as create a binding between this address and an other address) on a particular IP address. The AC is also based on the shared-secret key only known by the mobile and server 103. Access router 101 will provide the particular IP address along with the mobile ID and the AC to server 103, which validates the IP address by analyzing the AC. More particularly, AAA server 103 will use the mobile ID along with other parameters such as a Security Parameter Index (SPI), if provided, to lookup (in its database) the security parameters corresponding to mobile node. As a result the AAA server would have the keying materials and the algorithm that would have been used by the mobile node to create the IP address and the authentication code.

AAA server 103 derives both an IP address and an AC using the appropriate shared key, and if both the IP address and the AC match the value supplied by node 102, then AAA server 103 knows that the IP address supplied by node 103 is valid. In an alternate embodiment the AR 101 would have access to the key that would be used by the node to create the key and AC. So the AR can verify that the mobile node 102 is a legitimate owner of the IP address. It should be noted that the shared key used to generate the IP address and the shared key used to generate the AC may be different keys. In other words, a first key may be used to generate the IP address and a second key may be utilized to generate the AC.

FIG. 2 is a block diagram of node 102 (sometimes referred to as a mobile node (MN)). As shown, node 102 comprises logic circuitry 201, transmit circuitry 202, receive circuitry 203, and storage (database) 204. Storage 204 serves to store an address generation key shared among node 102 and server 103. Logic circuitry 201 preferably comprises a microprocessor controller. In the preferred embodiment of the present invention logic circuitry 201 serves as means for generating an address based upon a shared-secret key and means for generating an authentication code based on the shared-secret key. Transmit and receive circuitry 202-203 are common circuitry known in the art for communication utilizing well known network protocols, and serve as means for transmitting and receiving messages. For example, transmitter 202 and receiver 203 may comprise well known IEEE 802.11 transmitters and receivers that utilize the IEEE 802.11 network protocol. Other possible transmitters and receivers include, but are not limited to transceivers utilizing Ethernet, Bluetooth, IEEE 802.16, or HyperLAN protocols.

During generation of an address, logic circuitry 201 generates a new IP address that comprises a prefix and a suffix. The prefix is provided by access point 101, with the suffix being generated by logic circuitry 201 as follows:

Suffix=Hash (*MN-AAA* key, *MN_ID*|*AR_ID*|advertised network prefix |"Suffix Generation Key")

IP address of Node=Concatenation {Advertised network prefix and truncate[Suffix, suffix_lenght]}

MN-AAA key is the shared key that is known only to node 102 and the trusted server such as AAA server. The MN-AAA key indicated here may be for instance a long term key preconfigured in node 102 and the AAA server for the purpose of address generation. Alternately it may be a long term key used for other purposes such as authentication such as protocol such as Extensible Authentication Protocol (EAP). In another embodiment it may be an Application Specific Master Key (AMSK) derived using an EAP method from a long term EAP key. MN_ID may for instance be the Network Access Identifier (NAI) of the node or the MAC address of the node or the Session Initiation Protocol Universal Resource Indicator (SIP URI) of the user currently utilizing the node. The AR_ID may be the IP address of the access router to which is the first hop router from the node. The advertised network prefix is the prefix of the subnet to which the node is connected.

The above formula is only illustrative of the process and may be modified for instance by adding additional parameters such as the prefix length, a collision count, a challenge parameter, address validity lifetime etc. The formula may additionally be modified by removing parameters such as advertised network prefix, or using an encryption algorithm instead of a hash. Furthermore a multi-step process may be used to derive the suffix. For example AR Specific Address Key=Hash (*MN-AAA* key, *AAA_ID*|*AR_ID*|*SPI*|"Step 1")

Suffix=Hash (*AR* Specific Address Key, *MN_ID*|Prefix|collision count |"Suffix")

IP address of Node=Concatenation {Advertised network prefix and truncate[Suffix, suffix_length]}

In alternate embodiments, AR 101 specific key may optionally be sent securely to the corresponding AR 101 to enable AR 101 verify the IP address of the mobile node or generate additional IP address (if needed) for the MN without contacting the AAA server. If an address created by a mobile node is a duplicate of the address created by another node, then in one embodiment the AR can create a new verifiable address for the node using the shared key by modifying the collision count and send it to the mobile node using a message such as Neighbor Advertisement Acknowledgement defined in [RFC 4068]. Other parameters, such as AR_ID, can also be utilized to create a second IP address when a second IP address is needed.

In yet another alternate embodiment, node 102 and the server 103 may first perform a Diffe-Helman (DH) exchange which is authenticated by the AAA server using the shared MN-AAA key. This process would result in a key called the Diffe-Helman Key known only to the mobile node and AR 101. This may be utilized to create the IP address. In this embodiment AR 101 can verify the IP address created by the node without contacting the AAA server. In yet another embodiment, node 102 and the trusted server may create an IP Security Association (IPSec SA) and then utilize the key associated with IPSec SA, say one of the child SAs to derive the IP address.

The IP address generation may occur in a mobile node 102 or at another node in the network such as an access router or AAA server. In one embodiment, a mobile node may create an IP address and advertise the address. The AR may determine that this address is already being used by another node and instead create a new IP address. To do so the AR may use a collision count field suffix computation algorithm and increment it for every collision. Alternately the AR may derive another key with the MN and use the newly derived key.

Furthermore in yet another embodiment whole or part of the prefix may also be derived by using a shared key. This key may be the same or different from the key used for the suffix.

Similarly in some networks the entire address may be derived using the shared key without separately obtaining a prefix and suffix.

When an entity in a communication network such as an access router needs to verify whether a mobile node is authorized to use a particular IP address it can do so by contacting the trusted network server. Such verification may be needed for instance when a mobile node sends a binding update to an access router as described in Fast Mobile IPv6 or when the mobile node responds to a neighbor solicitation to ensure that no other node in the network is using that address and to create a mapping between the mobile nodes IP address and the mobile nodes MAC address. In one instance prior to sending a binding update, the mobile node may send a Handover Key Request (HKReq) to the Access Router as described in [HK-Draft] to obtain a key to secure the binding update messages. When the AR receives the HKReq, in one embodiment AR 101 may go to the AAA server to verify that a mobile node is claiming the right IP address. The MN_ID, IP address and the Authentication Code will be part of the HKReq. In another embodiment, the AAA server may provide information, such as the "AR Specific Address Key", that would enable AR 101 to verify the IP address by itself. In another instance, the MN responds to the neighbor solicitation using a neighbor advertisement. In one embodiment, the neighbor solicitation may include a freshness parameter such as a nonce or timestamp to prevent replay attacks. In the neighbor advertisement MN will include its MN_ID, IP address and Authentication Code. These values may then be verified to determine that the MN is allowed to use the IP address.

FIG. 3 is a flow chart showing operation of node 102. In particular, FIG. 3 shows steps to create a routing address. It should be noted that while the following steps show the mobile node using the procedure to statelessly configure an IP address, in some embodiments where a network server such as a DHCP server, Mobile IP home agent, Access Router or AAA server needs to create an IP address for the mobile, these steps would then be done by a network server. The logic flow begins at step 301 where node 102 determines a need to generate an address. Next, at step 303, logic circuitry 201 accesses the shared-secret (shared-address generation) key within storage 204. At step 305 the shared-secret key is used to generate a suffix and at step 307 the prefix of the subnet where the address will be used is determined. At step 309 the prefix and suffix are combined to create a routing address for the node 102. The routing address preferably comprises an IP address, but alternatively may comprise other forms of routing addresses, such as, but not limited to a Medium Access Protocol address, or a session initiation protocol address. As discussed above, the shared key comprises a long term key preconfigured in the node and a server for the purpose of address generation. The routing address suffix is created by hashing the shared key, wherein the shared key is known only to the mobile unit and a network server. In one embodiment of the present invention the address suffix is based on the shared-key; hashed with the address prefix being provided.

FIG. 4 shows the steps at mobile node 102 to claim ownership the IP address. At step 401, the need to provide a proof of the address is determined. This may for instance be in conjunction with sending a neighbor advertisement or HKReq. A step 403, the mobile determines a shared secret key that will be used to create the authentication code. At step 405, the mobile node determines the authentication code using the shared key. In one instance, this is done by creating a hash of the shared key and part of the message that is being sent by the node 102. The authentication code and the address are provided to access point 101 via transmitter 202.

As stated above, in one embodiment, access point 101 will receive the authentication code and the address and pass these to AAA-Server 103 with any additional information if needed such as collision count, prefix etc. AAA-server 103 uses the mobile ID along with other parameters such as Security Parameter Index (SPI), if provided, to look up the shared key that would be used by the mobile node for address generation. The AAA server also determines the algorithm, key etc. that will be used to create the authentication code. AAA-server 103 then generates the IP address and the AC. If the generated IP address and the generated AC match those supplied by the mobile, then the mobile is authenticated and is using the right IP address. In an alternate embodiment the AR may send the MN_ID and AC to the AAA server the AAA sever verifies the AC and sends the IP address to the AR which then matches the IP address provided by the MN and the AAA server. In other words, the AR will receive an IP address from a node created using a shared key and provide the server the IP address. In response, the AR will receive information used to determine if the IP address belongs to the node. This information may simply comprise an IP address generated by the server or may comprise other information used to validate the IP address. The AR may compare the IP address received by the node with the IP address received by the server, and if they match, the IP address will be validated.

FIG. 5 is a flow chart showing operation of server 103. The logic flow begins at step 501 where a first routing (e.g., a first IP) address and the corresponding Authentication Code is received from a mobile node (forwarded by an AR). A set of security parameters including the shared secret key used for creating IP address and an authentication code is determined by server 103 at step 503. As discussed above, the shared-secret key is shared between the mobile node and server 103. Server 103 then creates a second routing address (step 505) and an authentication code (step 507) based on the shared key. Finally at step 509 the first routing address is authenticated if the first and the second routing address match and the first and the second authentication code match.

The following text shows the changes necessary to IETF address configuration in order to practice the above steps.

This section describes a method of using a Pre-Shared Key (PSK) to derive the IPv6 address of a node. The input parameters for PBA Generation include an Address Generation Key (AGK) generated using the PSK, a link ID of the node (e.g., MAC address), a nonce, the ID of the router advertising the prefix and the advertised network prefix itself. The AGK is derived from the PSK as follows.

$AGK=PRF$ (PSK, Node $ID$|"Address Generation Key"), where | denotes concatenation.

In AAA-based scenarios, the PSK is the key that the node shares with the AAA server (e.g., MN-AAA secret). The Node ID in this case is the NAI of the node.

The IPv6 suffix of the address of the node is derived as follows.

Address Suffix=$PRF$ ($AGK$, Link $ID$|Router $ID$|Nonce |Collision Count), where | denotes concatenation.

The Link ID may be the MAC address of the node; the Router ID is the IP address of the router advertising the IPv6 prefix; the nonce is a random value generated by the node. It is recommended that the nonce be a cryptographically generated value for added privacy. The collision count by default is 0 and is incremented by 1 every time there is a collision on the generated address. The Pseudo Random Function (PRF) used is SHA-1.

The generated suffix is then concatenated with the advertised prefix to form a complete IPv6 address for the node.

4. PBA Verification

The PBA may be sent to an entity that shares the PSK with the node for address ownership verification. Such a message must contain a hash of the address generated using the PSK. For instance, a node may use the AAA key to sign the message to the AAA server. The other parameters such as the nonce, link ID, router ID and collision count must also be sent to the AAA server.

After successful verification of the signature, the AAA server must generate the AGK corresponding to the node based on the PSK as in the previous section. The AGK can then be used along with the other parameters in generating the address suffix in exactly the same manner as done by the node. It is generally sufficient to verify that the node is claiming the right suffix.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for a mobile node to create a routing address, the method comprising the steps of:
   accessing by the mobile node a shared key, wherein the shared key is known only to a mobile node and a network server;
   creating by the mobile node the routing address based on the shared key;
   creating by the mobile node an authentication code based on the shared key, wherein the authentication code is used to verify that the address belongs to the node; and
   providing by the mobile node the routing address along with the authentication code so that the address can be validated with the authentication code.

2. The method of claim 1 wherein the step of creating the routing address comprises the step of creating by the mobile node at least a part of an address prefix based on the shared key.

3. The method of claim 1 wherein the step of creating a routing address comprises the step of creating by the mobile node an address suffix based on the shared key and being provided an address prefix by an access router or another node.

4. The method of claim 1 wherein the shared key comprises a long term key preconfigured in a node and a server for the purpose of address generation.

5. The method of claim 1 wherein the routing address comprises an IP address, a Medium Access Protocol address, or a session initiation protocol address.

6. The method of claim 1 further comprising the step of:
   creating by the mobile node a second routing address based on the shared key.

7. The method of claim 6 wherein the second routing address is based on a collision count.

8. The method of claim 1 further comprising the steps of:
   creating by the mobile node an authentication code (AC) based on the shared key
   providing by the mobile node the IP address and the AC to an access point.

9. A mobile node comprising:
   storage within the mobile node storing a shared key, wherein the shared key is known only to a mobile node and a network server;
   logic circuitry within the mobile node creating an IP address based on the shared key, and also creating an authentication code based on the shared key, wherein the authentication code is used to verify that the address belongs to the node; and
   a transmitter within the mobile node providing the routing address along with the authentication code so that the address can be validated with the authentication code.

10. The apparatus of claim 9 wherein the logic circuitry creates at least part of an address prefix based on the shared key.

11. The apparatus of claim 9 wherein the logic circuitry creates an address suffix based on the shared key and is provided an address prefix.

12. A method comprising the steps of:
   receiving at a network server a first routing address corresponding to a first node from a second node;
   receiving at the network server an authentication code corresponding to the first node;
   determining at the network server a shared key wherein the shared key is known only to the first node and a server;
   using at the network server the shared key and the authentication code to authenticate the routing address corresponding to the first node; and
   sending by the network server information to the second node to enable verification that the first node is authorized to use the first routing address.

13. The method of claim 12 where in the step of authenticating the routing address corresponding to the first node comprises the steps of:
   receiving at the network server a first authentication code (AC);
   creating at the network server a second authentication code based on the shared key; and
   authenticating at the network server the first routing address if the first and the second authentication codes match.

14. A method comprising the steps of:
   receiving at an access router a handover key request to create a key to secure binding update messages, the request containing an IP address from a node created using a shared key, wherein the shared key is known only to the node and a network server;
   receiving at an access router information from the server used to determine if the IP address belongs to the node;
   receiving at an access router a second request to create a binding between the IP address and another address, the request containing the IP address and the authentication code; and
   verifying by an access router that the node was authorized to use the IP address using the authentication code and information from the server.

15. The method of claim 14 wherein the step of verifying comprises comparing by an access router an authentication code in a message from the node with an authentication code created using information received from the server.

16. The method of claim 15 wherein the information comprises a key derived from the shared key.

17. The method of claim 1 where in the shared key is dynamically created by the mobile node using a Diffe-Helman method or derived from an Extensible Authentication Protocol key.

18. The method of claim 1 wherein in the network server is one of an AAA server, a mobility server, or an access router.

19. The apparatus of claim 9 further comprising:
a transceiver located at the mobile node to transmit a message to the network server and to receive information from the network server used to determine if the IP address belongs to the mobile node.

* * * * *